(12) United States Patent
Li et al.

(10) Patent No.: US 12,189,515 B2
(45) Date of Patent: Jan. 7, 2025

(54) IDENTIFYING REGRESSION TEST FAILURES

(71) Applicant: International Business Machines Corporation, Armonk, NY (US)

(72) Inventors: Xiao-Yu Li, Beijing (CN); Hua Wei Fan, Beijing (CN); Jiangang Deng, Beijing (CN); Hong Wei Sun, Beijing (CN); Xiao Ling Chen, Beijing (CN); Wen Ji Huang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/577,844

(22) Filed: Jan. 18, 2022

(65) Prior Publication Data
US 2023/0229581 A1 Jul. 20, 2023

(51) Int. Cl.
*G06F 11/36* (2006.01)
(52) U.S. Cl.
CPC ...... *G06F 11/3624* (2013.01); *G06F 11/3664* (2013.01); *G06F 11/3692* (2013.01)
(58) Field of Classification Search
None
See application file for complete search history.

(56) References Cited

U.S. PATENT DOCUMENTS

| | | | |
|---|---|---|---|
| 6,106,571 A * | 8/2000 | Maxwell | G06F 11/3624 714/E11.209 |
| 7,926,042 B2 | 4/2011 | Mehta et al. | |
| 8,473,925 B2 | 6/2013 | Gagliardi et al. | |
| 8,732,674 B1 | 5/2014 | Agha | |
| 9,594,662 B2 | 3/2017 | Mani et al. | |
| 9,703,553 B2 * | 7/2017 | Bates | G06F 11/3664 |
| 9,971,671 B2 | 5/2018 | Inamdar et al. | |
| 10,956,304 B2 | 3/2021 | Davis et al. | |
| 2004/0078691 A1 | 4/2004 | Cirne et al. | |
| 2009/0119648 A1 * | 5/2009 | Chess | G06F 11/3608 717/131 |

(Continued)

OTHER PUBLICATIONS

B. Guo and M. Song, "Interactively Decomposing Composite Changes to Support Code Review and Regression Testing," 2017 IEEE 41st Annual Computer Software and Applications Conference (COMPSAC), Turin, Italy, 2017, pp. 118-127. (Year: 2017).*

(Continued)

*Primary Examiner* — Andrew M. Lyons
(74) *Attorney, Agent, or Firm* — Cantor Colburn LLP; Teddi Maranzano

(57) ABSTRACT

Examples described herein provide a computer-implemented method for identifying regression test failures that includes comparing a base code to a new code to locate an updated aspect of a program. The method further includes inserting debug code into corresponding source files for each of the base code and the new code for the updated aspect. The method further includes building a first image for the base code and a second image for the new code, the first and second images running in respective first and second containers. The method further includes comparing debugging outputs from a regression test of the respective first and second containers to identify a regression test failure. The method further includes implementing a corrective action to correct the regression test failure.

16 Claims, 14 Drawing Sheets

(56) References Cited

U.S. PATENT DOCUMENTS

| | | | |
|---|---|---|---|
| 2014/0013307 A1* | 1/2014 | Hansson | G06F 11/3688 |
| | | | 717/124 |
| 2014/0096115 A1* | 4/2014 | Guan | G06F 8/41 |
| | | | 717/140 |
| 2015/0082286 A1 | 3/2015 | Gittleman et al. | |
| 2015/0220426 A1* | 8/2015 | Spektor | G06F 8/71 |
| | | | 717/131 |
| 2018/0246803 A1* | 8/2018 | Zhang | G06F 11/3688 |
| 2020/0097389 A1* | 3/2020 | Smith | G06F 11/0793 |
| 2020/0233961 A1* | 7/2020 | Wolfin | G06F 11/3495 |
| 2020/0327008 A1* | 10/2020 | Singh | G06F 9/451 |
| 2021/0042217 A1* | 2/2021 | Hwang | G06F 11/3604 |
| 2022/0365775 A1* | 11/2022 | Wei | G06F 11/3604 |
| 2023/0023876 A1* | 1/2023 | Brzóska | G06F 9/48 |

OTHER PUBLICATIONS

K. Yu, M. Lin, J. Chen and X. Zhang, "Practical isolation of failure-inducing changes for debugging regression faults," 2012 Proceedings of the 27th IEEE/ACM International Conference on Automated Software Engineering, Essen, Germany, 2012, pp. 20-29. (Year: 2012).*

Banerjee; "Tracing and Profiling Microservices Application Deployed on IBM Cloud Private"; Retrieved Online from https://medium.com/ibm-cloud/tracing-and-profiling-microservices-application-deployed-on-ibm-cloud-private-fe1f4c274329; Dec. 22, 2017; 6 Pages.

Zhao et al.; "How to Do a Million Watchpoints: Efficient Debugging Using Dynamic Instrumentation"; Mar. 2008; 9 Pages.

* cited by examiner

| File | Change | Function | Affected Variables |
|---|---|---|---|
| Sample.c | | | |
| ... | | | |

| File | Change | Function | Affected Variables |
|---|---|---|---|
| Sample.c | 5c5 | | |
| Sample.c | 11a12,13 | | |
| Sample.c | 18,19d19 | | |
| ... | | | |

```
int GetInitValue() {
    int initValue;
    DYN_CODE_PRINT_BEFORE(initValue);
    initValue = 25;
    DYN_CODE_PRINT_AFTER(initValue);
    return initValue;
}
```

```
int GetInitValue() {
    int initValue;
    DYN_CODE_PRINT_BEFORE(initValue);
    initValue = 10;
    DYN_CODE_PRINT_AFTER(initValue);
    return initValue;
}
```

*FIG. 5E*

| File | Change | Function | Affected Variables |
|---|---|---|---|
| Sample.c | 5c5 | GetInitValue | intValue, Variable_G |
| Sample.c | 11a12,13 | Add | Variable_A, Variable_G |
| Sample.c | 18,19d19 | UpdateGlobal | Variable_B, Variable_C, Variable_G |
| ... | | | |

IDENTIFYING REGRESSION TEST FAILURES

BACKGROUND

Embodiments described herein generally relate to processing systems, and more specifically, to identifying regression test failures.

Containers provide an application layer approach to virtualization. A container packages together code and its dependencies, and the container can be run on a physical processing system. Multiple containers can be run on the same physical processing system. This approach uses less resources than a virtual machine approach to virtualization.

SUMMARY

In one exemplary embodiment, a computer-implemented method for identifying regression test failures is provided. The method includes comparing a base code to a new code to locate an updated aspect of a program. The method further includes inserting debug code into corresponding source files for each of the base code and the new code for the updated aspect. The method further includes building a first image for the base code and a second image for the new code, the first and second images running in respective first and second containers. The method further includes comparing debugging outputs from a regression test of the respective first and second containers to identify a regression test failure. The method further includes implementing a corrective action to correct the regression test failure.

Other embodiments of the present invention implement features of the above-described method in computer systems and computer program products.

The above features and advantages, and other features and advantages, of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIGS. 5A-5H depict aspects according to one or more embodiments described herein;

Figure 1:
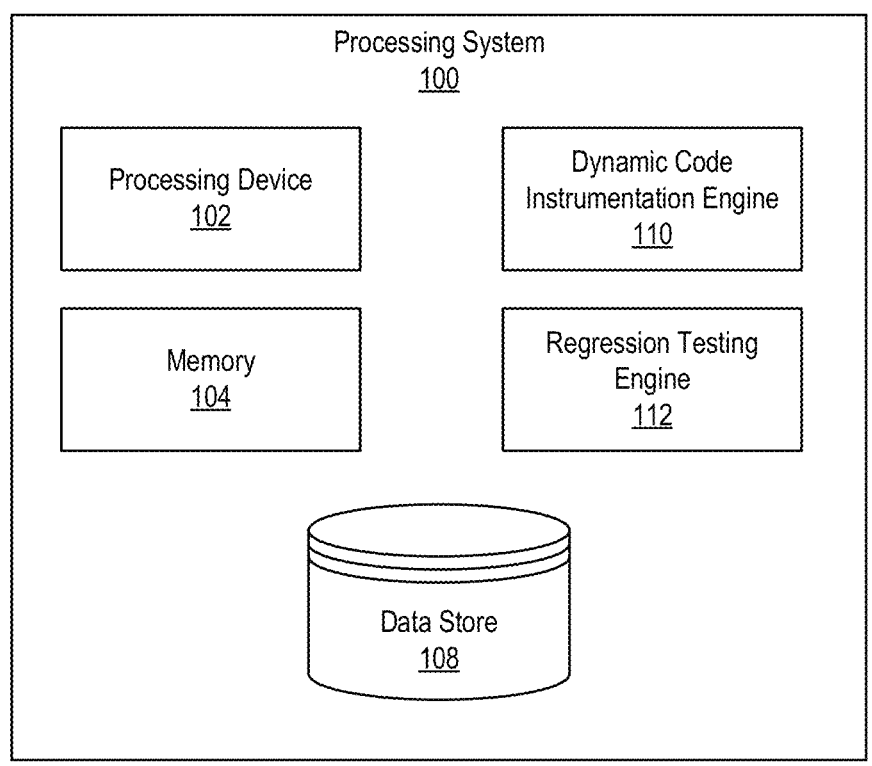
FIG. 1 depicts a block diagram of a processing system for identifying regression test failures according to one or more embodiments described herein

The diagrams depicted herein are illustrative. There can be many variations to the diagram or the operations described therein without departing from the scope of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide a smart code instrumentation technique to help developers identify regression test failure root causes for newly built images that run in a container environment.

Regression testing verifies whether code changes impact existing functionality of an application. For example, if a new feature is added to an existing application, regression testing may be performed to ensure the new feature does not cause faults/errors to the existing functionality of the application. Regression testing includes re-running prior tests (e.g., functional and/or non-functional tests) to test the existing application in view of the newly added code. This ensures that the previously tested existing application still performs after changes are made to the code.

With the widespread use of cloud-based applications and DevOps solutions, the ability to quickly identify the root cause of regression test failure of newly built images is useful to developers. However, debugging in the container environment is usually difficult, either because the business logic is too complicated to reproduce the issue using a step-by-step debug mode or due to lack of commonly used debugger tools (not packed in the images).

For example, consider the following. Open-source projects are widely used and are often very large. The executing context of such open-source projects is always changing, especially in a cloud environment. This makes it difficult for developers to make changes (e.g., improvements, added functions, bug fixes, etc.) quickly. A developer may deliver a change to code executing in a container through a docker image, but something may go wrong (some error may occur). To identify the root cause of the error, the developer can use debugger tools, enable a trace, or even use a program's "print" or "display" statement directly, etc. However, it is not easy for the developer to use such tools in a cloud environment. Sometimes, debug tools may not be available in a container. Sometimes, the business logic is too complex, and the error cannot easily be reproduced in a debug step-by-step mode, such as if multiple threads are involved. According to one or more embodiments, the method can be applied for deeper levels affected functions, variables, and/or runtime information. According to one or more embodiments, the method can be applied for global variables defined in configuration files. According to one or more embodiments, the method can be also applied for a specific position (e.g. a function entry point).

To address these and other shortcomings of the prior art, one or more embodiments described herein provide a smart code instrumentation technique to help developers identify regression test failure root causes for newly built images that run in a container environment. According to one or more embodiments described herein, a method is provided that compares a base code (or "original code") and a new code to locate updated aspects such as functions, variables, and/or runtime information. The method then inserts debug code to the corresponding source files in each of the code bases (base code and new code) and then builds two images, which are run in containers. Debug outputs from the containers are collected and compared to analyze the regression test failures. In some examples, a configuration file is provided to control the debug code generation in case more information is needed.

One or more embodiments described herein provide technological improvements over current methods of regression testing. Disadvantages of contemporary approaches may include that regression testing does not perform adequately for applications deployed in container-based environments. One or more embodiments described herein provide technical solutions to one or more of these disadvantages of existing solutions by inserting dynamic code instrumentation at locations of code changes within base (original) code and new code. According to one or more embodiments described herein, the dynamic code instrumentation is implemented by the compiler tool chain automatically, which saves time and improves accuracy. Further, according to one or more embodiments described herein, runtime container information can be collected through a configuration file, which provides for the compiler tool to insert code fixes to gain dynamic information. Since both the original and new code are rebuilt with the dynamic code instrumentation, regressing test results performed on both images (images corresponding to the original and new code) aids in debugging complicated scenarios, especially in container-based implementations, according to one or more embodiments described herein. More specifically, the one or more embodiments described herein are able to perform regression testing on complex, container-based applications where conventional approaches to regression testing have failed.

Turning now to FIG. 1, a block diagram of a processing system 100 for identifying regression test failures is depicted according in accordance with one or more embodiments of the present invention. The processing system 100 includes a processing device 102, a memory 104, a data store 108 a dynamic code instrumentation engine 110, and a regression testing engine 112.

The processing device 102 can include any suitable device(s) for processing computer-executable instructions, such as a central processing unit, microprocessor, etc. The memory 104 can include any suitable device(s) for storing computer-executable instructions, such as a random access memory, a read-only memory, a flash memory, etc. The data store 108 can include any suitable device(s) for storing data, such as a hard disk or other mass storage device. In some examples, the data store 108 can include a database.

The various components, modules, engines (e.g., the dynamic code instrumentation engine 110 and the regression testing engine 112), etc. described regarding FIG. 1 can be implemented as instructions stored on a computer-readable storage medium, as hardware modules, as special-purpose hardware (e.g., application specific hardware, application specific integrated circuits (ASIC s), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 102 for executing those instructions. Thus a system memory (e.g., the memory 104) can store program instructions that when executed by the processing device 102 implement the engines described herein. Other engines can also be utilized to include other features and functionality described in other examples herein.

The dynamic code instrumentation engine 110 provides a smart code instrumentation technique to help developers identify regression test failure root causes for newly built images that run in a container environment. The regression testing engine 112 provides for performing regression testing on code, such as code stored in the data store 108. The features and functionality of the engines 110, 112 are described in more detail with reference to the method 300 of FIG. 3.

Figure 2A:
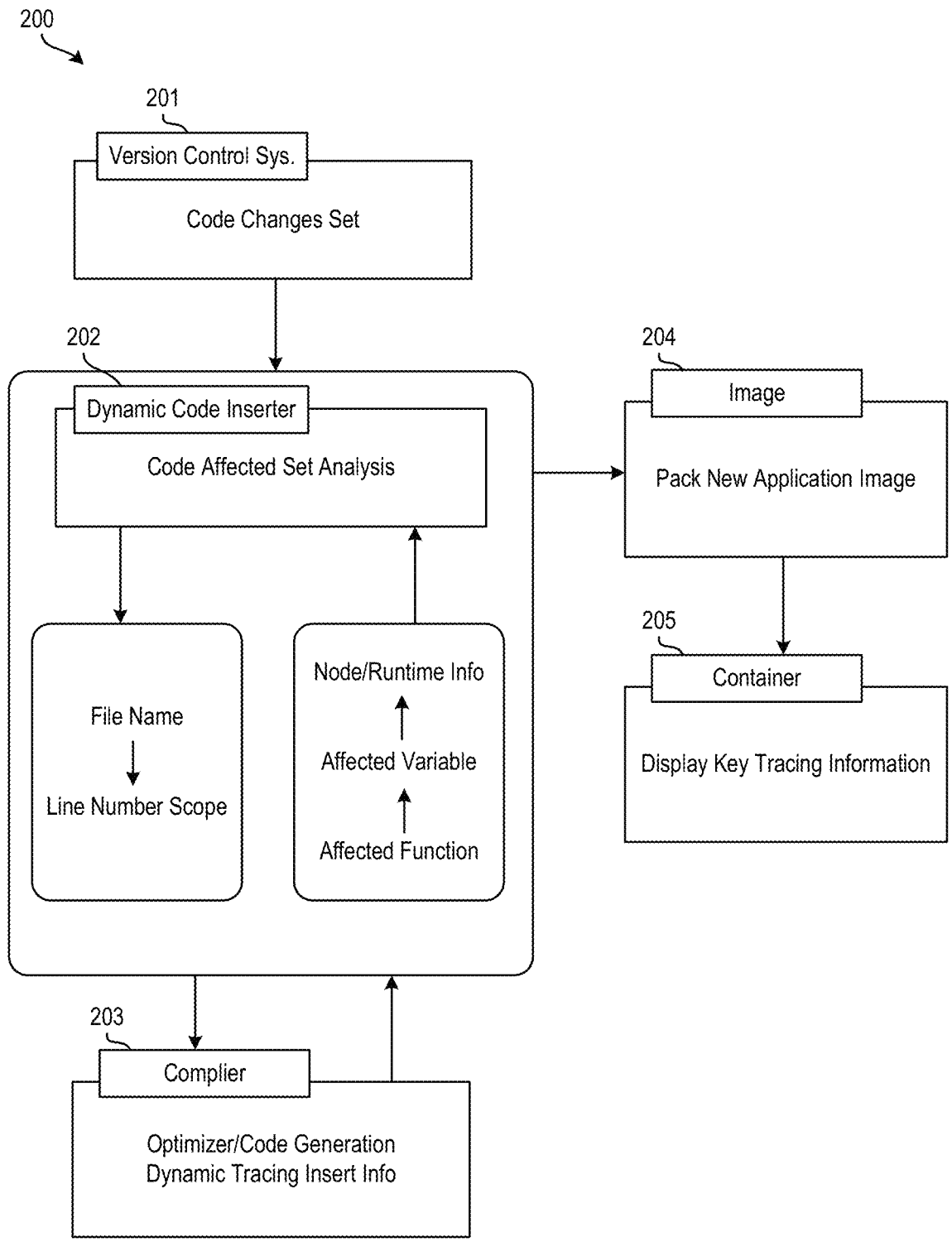
FIG. 2A depicts a block diagram of an architecture for identifying regression test failures according to one or more embodiments described herein.

Turning now to FIG. 2A, a block diagram of an architecture 200 for identifying regression test failures is depicted according in accordance with one or more embodiments of the present invention. A version control system 201 retrieves and analyzes code changes by comparing original (base) code and new code. The differences between the original code and the new code define a code changes set, which is passed to a dynamic code inserter 202. The dynamic code inserter 202 performs dynamic code instrumentation, which generates debug code to the corresponding source files in each of the code bases (base code and new code). The debug code can include updates to both the original code and the new code to insert key tracing code for affected functions, variables, and/or node runtime information. Particularly, the dynamic code inserter 202 performs a code affected set analysis to identify the location (by file name and line number scope, for example) of affected functions/variables. The compiler 203 uses the inserted debug code to insert the debug code for compiling. The affected function, affected variable, and affected function are then passed back to the dynamic code inserter, which builds two images 204 using the PackNewAPPImage command. The two images 204 correspond to the original and new code, each having the debug code inserted thereunto. The images 204 are run in containers 205, and key tracing information is then returned/displayed.

Figure 2B:
FIG. 2B depicts a block diagram of sample original code and new code according to one or more embodiments described herein.

FIG. 2B depicts a block diagram of sample original code 250 (also referred to as "base code") and new code 251 according to one or more embodiments described herein. It should be appreciated that the new code 251 includes one or more changes relative to the original code 250. In this example, as shown, the value for "initValue" differs from "10" in the original code 250 to "25" in the new code "25." Also, the operations for "Variable_A" (new code 251) and "Variable_B" (original code 250) differ as shown. It should be appreciate that FIG. 2B depicts merely one example of sample code and that other examples are also possible without departing from the scope of one or more of the embodiments described herein.

Figure 3:
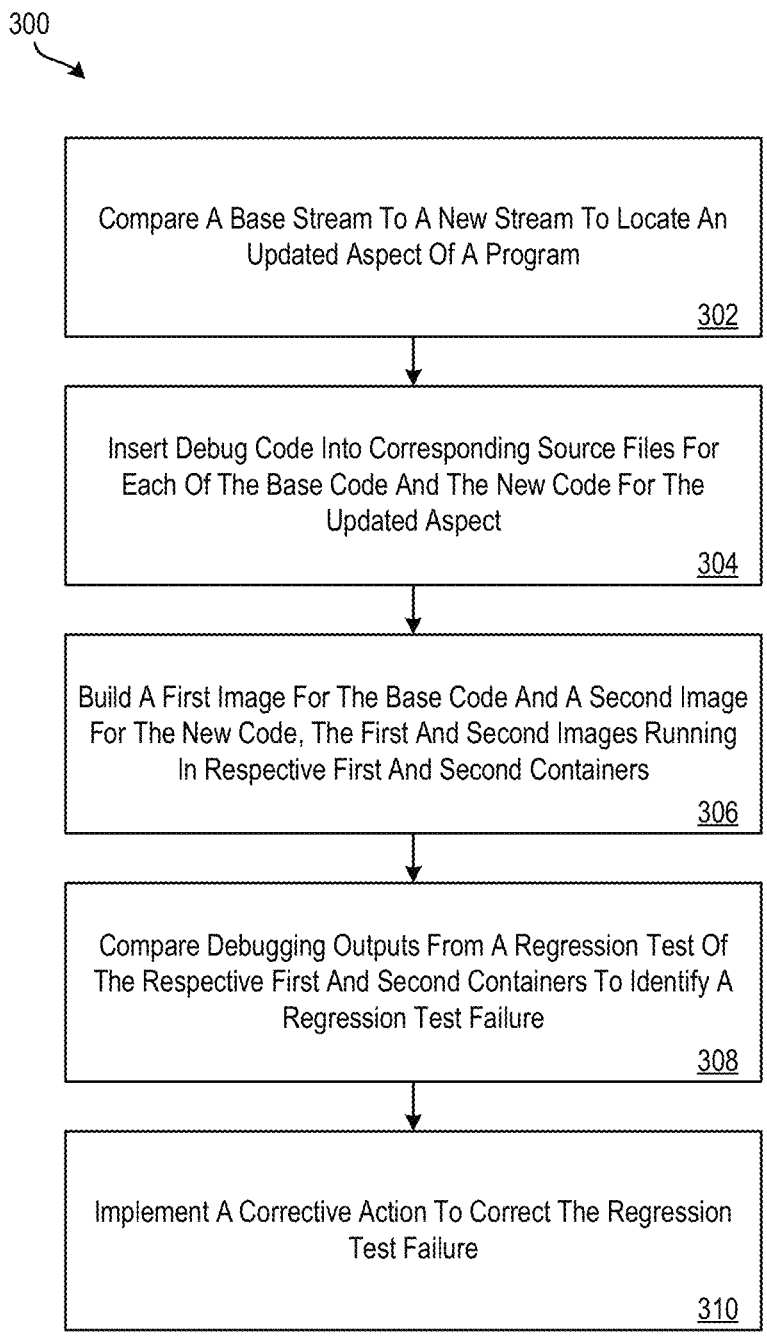
FIG. 3 depicts a block diagram of a method for identifying regression test failures according to one or more embodiments described herein.

FIG. 3 depicts a flow diagram of a method 300 for identifying regression test failures according to one or more embodiments described herein. The method 300 can be implemented by any suitable system and/or device, such as the processing system 100 of FIG. 1, the cloud computing node 10 of FIG. 6, the processing system 800 of FIG. 8, and/or the like, including components thereof such as the processing device 102 of FIG. 1, the processor(s) 821 of FIG. 8, and the like. The method 400 is now described in more detail with reference to the processing system 100 of FIG. 1.

At block 302, the dynamic code instrumentation engine 110 compares a base code (e.g., the original code 250) to a new code (e.g., the new code 251) to locate one or more updated aspects of a program.

At block 304, the dynamic code instrumentation engine 110 inserts a debug code into corresponding source code files for each of the base code and the new code for the updated aspect(s). That is, the dynamic code instrumentation engine 110 inserts a debug code into the source code file for the base code for the updated aspect(s) and also inserts the debug code into the source code file for the new code for the updated aspect(s).

At block 306, the dynamic code instrumentation engine 110 builds a first image for the base code and a second image for the new code. According to one or more embodiments described herein, the first and second images run in respective first and second containers. That is, the first image runs in a first container and the second image runs in a second container.

Regression testing can then be performed. For example, according to one or more embodiments described herein, the regression test engine 112 performs a regression test on the first and second images and generates debugging outputs for each of the first and second images. At block 308, the dynamic code instrumentation engine 110 compares debugging outputs from a regression test of the respective first and second containers to identify a regression test failure.

At block 310, the dynamic code instrumentation engine 110 implements a corrective action to correct the regression test failure. An example of a corrective action is to cause an error in the new code to be corrected. According to one or more embodiments described herein, an alert can be issued along with (or in some cases, instead of) the corrective action to alert a user (e.g., a developer) to the regression test failure.

Additional processes also may be included, and it should be understood that the process depicted in FIG. 3 represents an illustration, and that other processes may be added or existing processes may be removed, modified, or rearranged without departing from the scope of the present disclosure.

Figure 4:
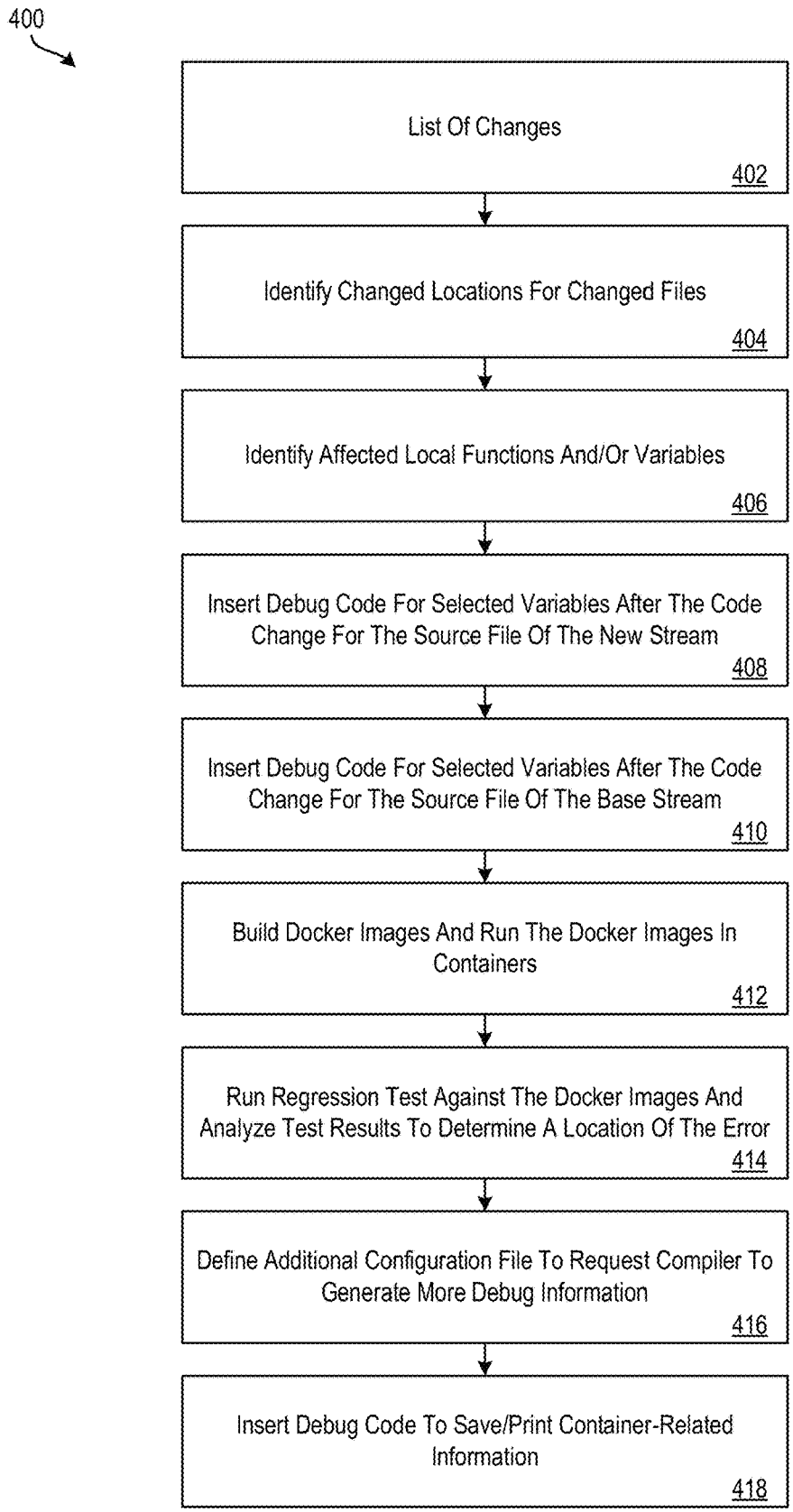
FIG. 4 depicts a block diagram of a method for identifying regression test failures according to one or more embodiments described herein.

FIG. 4 depicts a flow diagram of a method 400 for identifying regression test failures according to one or more embodiments described herein. The method 400 can be implemented by any suitable system and/or device, such as the processing system 100 of FIG. 1, the cloud computing node 10 of FIG. 6, the processing system 800 of FIG. 8, and/or the like, including components thereof such as the processing device 102 of FIG. 1, the processor(s) 821 of FIG. 8, and the like. The method 400 is now described in more detail with reference to the processing system 100 of FIG. 1 as well as the aspects of FIGS. 5A-5H.

At block 402, the dynamic code instrumentation engine 110 lists changes to the application. The changes represent the differences between the base code and the new code. For example, in FIG. 5A, a table 500 is shown that lists the changes to the base code utilizing a "GIT" command "git diff-tree-no-commit-id-name-only-r$CommitID" to list all the changes to files in the base code relative to the new code, for the file "Sample.c."

With continued reference to FIG. 4, at block 404, the dynamic code instrumentation engine 110 identifies changed locations for changed files based on the changes from block 404. For example, in FIG. 5B, a table 510 is shown that lists, for each changed file, the changes by the command "diff $old $new."

Figure 5C:
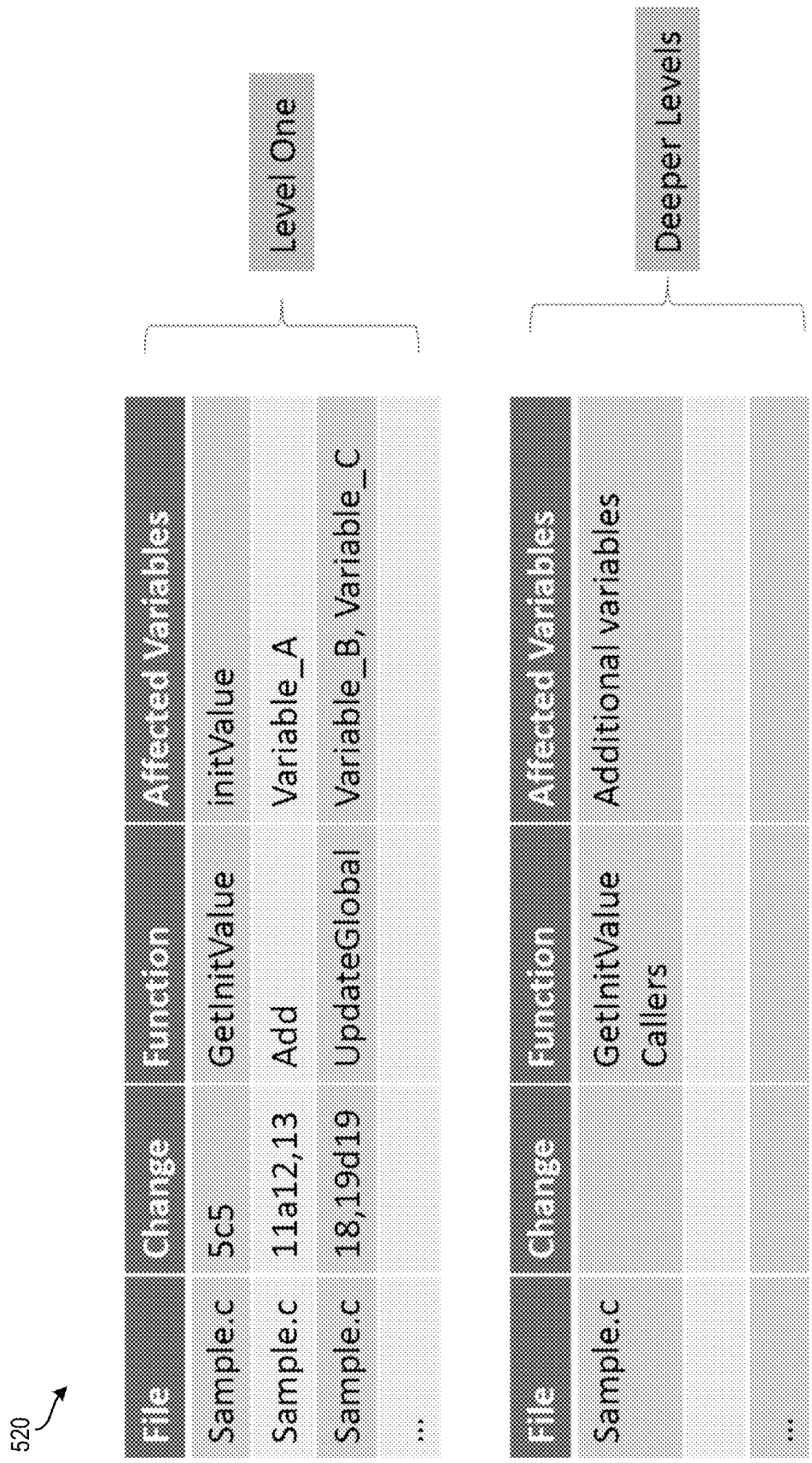

With continued reference to FIG. 4, at block 406, the dynamic code instrumentation engine 110 identifies affected local aspects (e.g., functions, variables, runtime information, etc.) of the changed files. For example, in FIG. 5C, a table 520 is shown that shows the affected local functions and variables for the changes identified in the table 510. This is a "level one" analysis. Deep level analysis is also possible, as shown in FIG. 5D, which depicts a table 530 showing additional variables affected by the affected local functions of the table 520.

With continued reference to FIG. 4, at block 408, the dynamic code instrumentation engine 110 inserts debug code for the selected aspects (e.g., functions, variables, runtime information, etc.) after the code change for the source file of the new code (e.g., the modified/new code file). For example, in FIG. 5D sample code 540 is shown. In this example, debug code for selected variables is inserted right after the code change for the GIT change to the new code source file. According to one or more embodiments described herein, the debug code can be a key tracing code for affected functions, variables, and/or runtime information. Key tracing code instruct the compiler to insert calls to user-defined tracing functions. The key tracing code can define entry and exit points for the tracing functions.

With continued reference to FIG. 4, at block 410, the dynamic code instrumentation engine 110 inserts debug code for selected aspects (e.g., functions, variables, runtime information, etc.) after the code change for the source file of the base code (e.g., original code file). It should be appreciated that the debug code used in block 408 is the same as the debug code used in block 410 and is inserted at the same location, according to one or more embodiments described herein. In the Example of FIG. 5E, sample code 550 is shown. In this example (like in FIG. 5D), debug code for selected variables is inserted right after the code change for the GIT change to the new code source file. According to one or more embodiments described herein, the debug code can be a key tracing code for affected functions, variables, and/or runtime information.

Figure 5F:
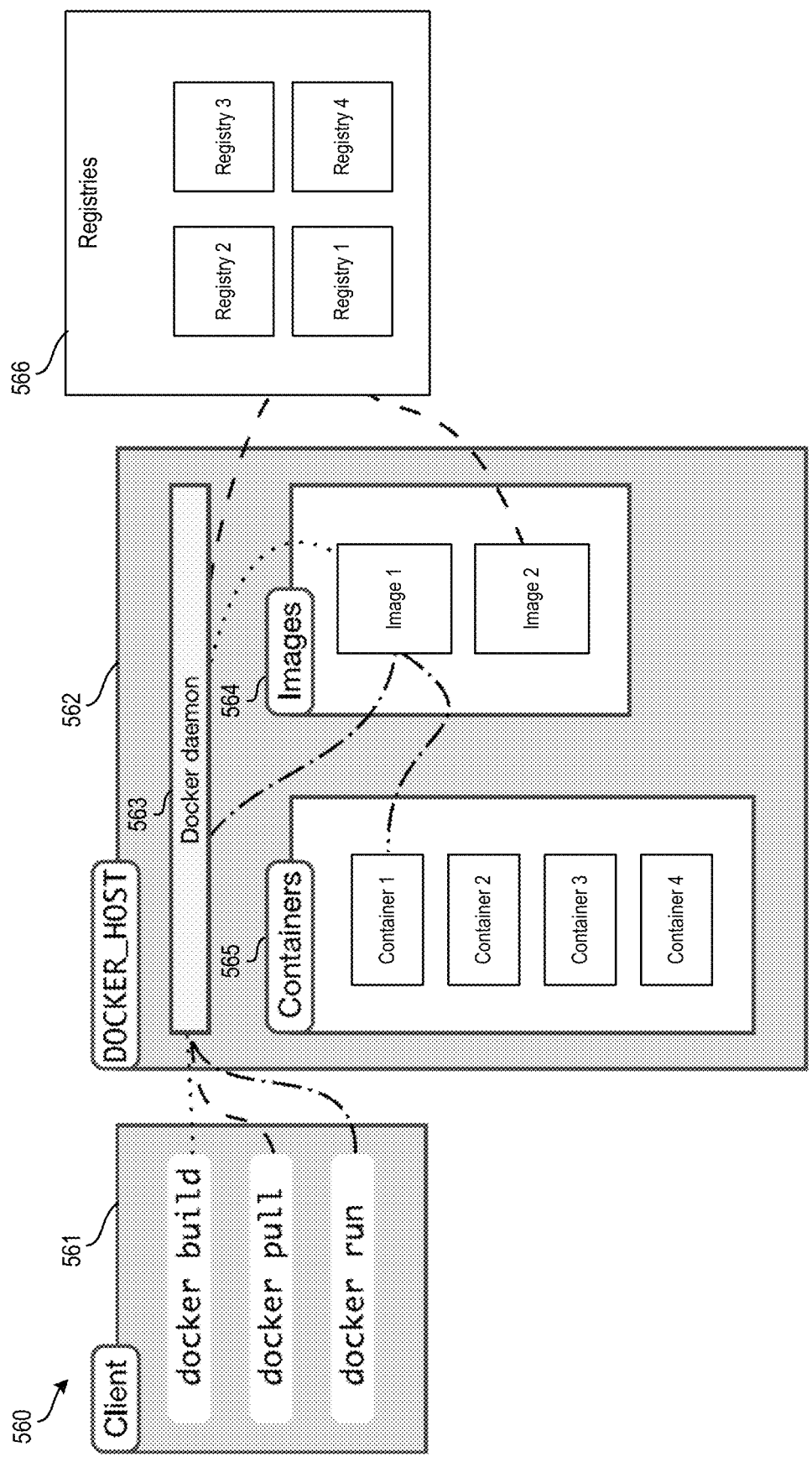

With continued reference to FIG. 4, at block 412, the dynamic code instrumentation engine 110 builds docker images for the base code and the new code and runs the docker images in containers. In the example of FIG. 5F, an architecture 560 is shown that includes a client 561, a docker host 562, and registries 566. The client 561 can perform operations, such as "docker build," "docker pull," and "docker run," among others. The docker host 562 includes a docker daemon 563 to receive commands associated with the operations of the client 561 and to implement them using images 564 and containers 565. The images 564 include image 1 and image 2 (although other images and/or numbers of images can also be included), and the containers 565 include container 1, container 2, container 3, and container 4 (although other containers and/or numbers of containers can also be included). The docker daemon 563 can, for example, implement an instruction from the client 561 to build image 1 and run image 1 on container 1, as shown. The docker host 562 can perform one or more of the instructions from the client 561 using registries 566, such as registry 1, registry 2, registry 3, and registry 4 (although other registries and/or numbers of registries can also be included).

Figure 5G:
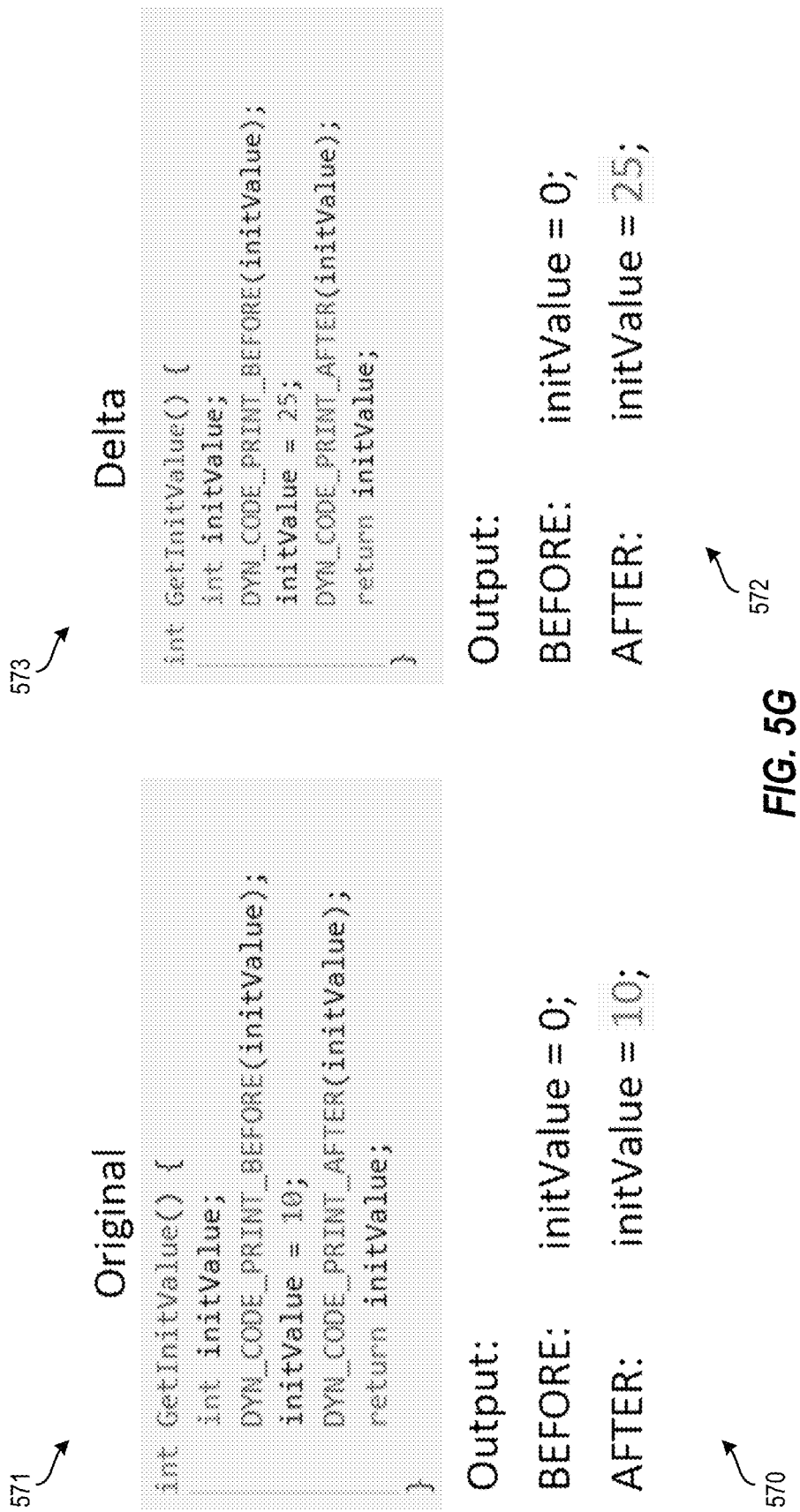

With continued reference to FIG. 4, at block 414, the regression engine 112 performs a regression test against the docker images and analyzes test results to determine a location of the error(s) (e.g., where the error(s) occurred). The regression test is run against both images, for example. As shown in FIG. 5G, the results 570, 572 of the respective original code 571 and new (e.g., "delta") code 573 are shown. As can be seen in the results 570, 572, the "initValue" between the two codes 571, 573 is different.

With continued reference to FIG. 4, at block 416, the dynamic code instrumentation engine 110 defines an additional configuration file to request the compiler to generate more debug information. This may be useful, for example, where more information is needed. For example, if a case fails because a global variable is too large, an additional global variable may be used. In such cases, as shown in the table 580 of FIG. 5H, the configuration definition "AdditionalVariable.cfg" may be defined to contain the global variable information. This will update the change tables with global variables.

With continued reference to FIG. 4, at block 418, the dynamic code instrumentation engine 110 inserts debug code to save/print container-related information. For example, debug code can be inserted to print a server address and save it in a configuration file. It should be appreciated that other examples are also possible.

Additional processes also may be included, and it should be understood that the process depicted in FIG. 4 represents an illustration, and that other processes may be added or existing processes may be removed, modified, or rearranged without departing from the scope of the present disclosure.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
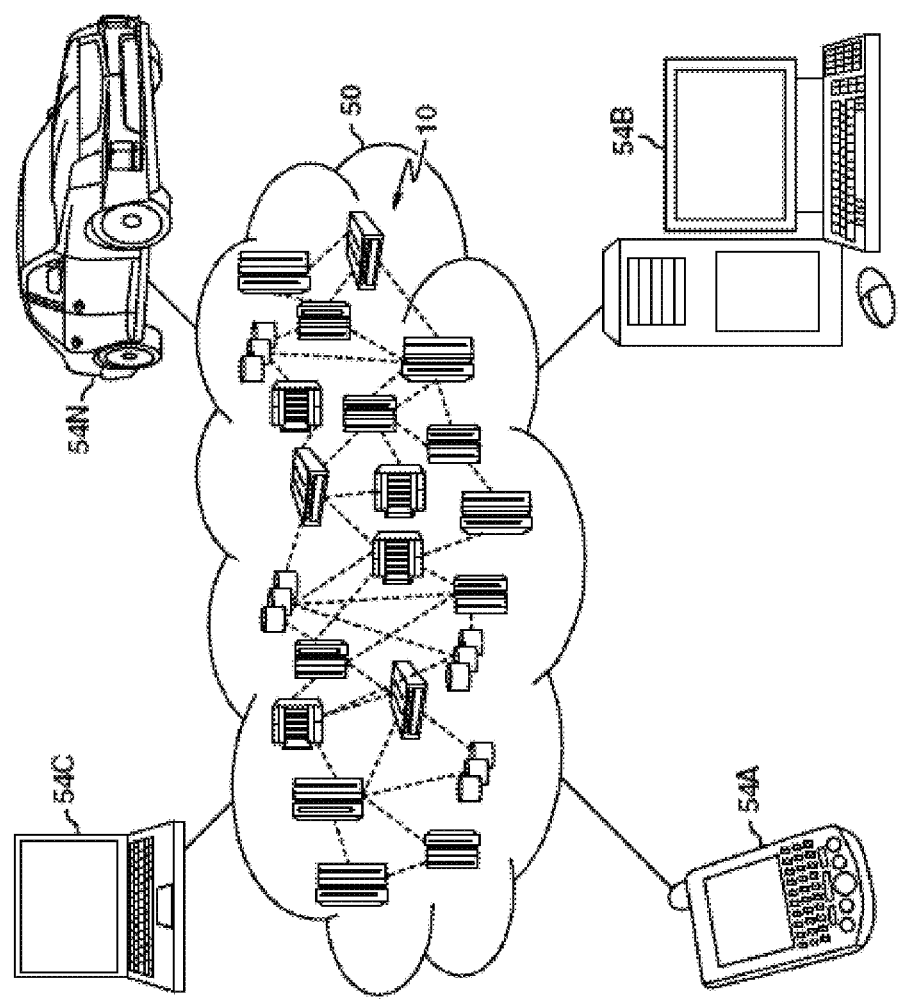
FIG. 6 depicts a cloud computing environment according to one or more embodiments described herein.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
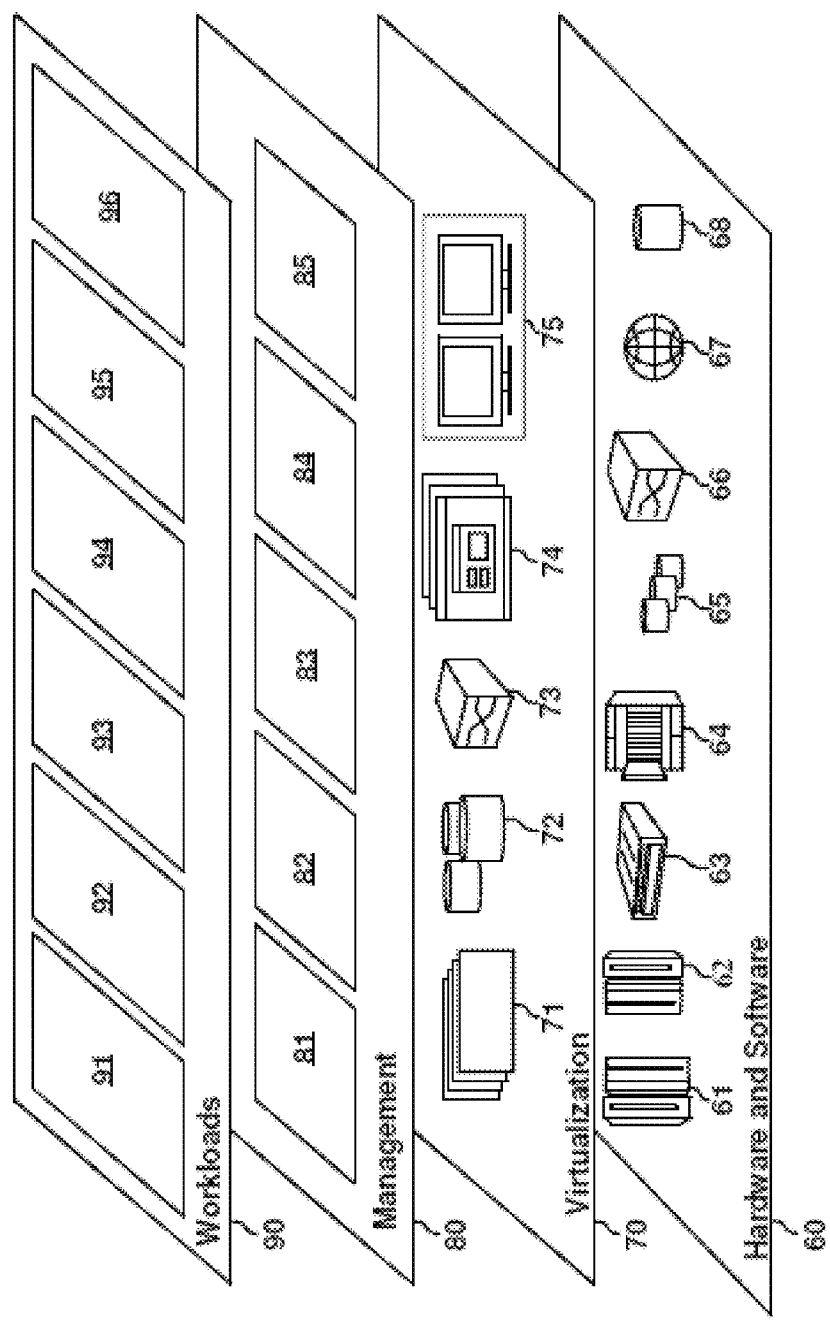
FIG. 7 depicts abstraction model layers according to one or more embodiments described herein.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and regression testing 96.

Figure 8:
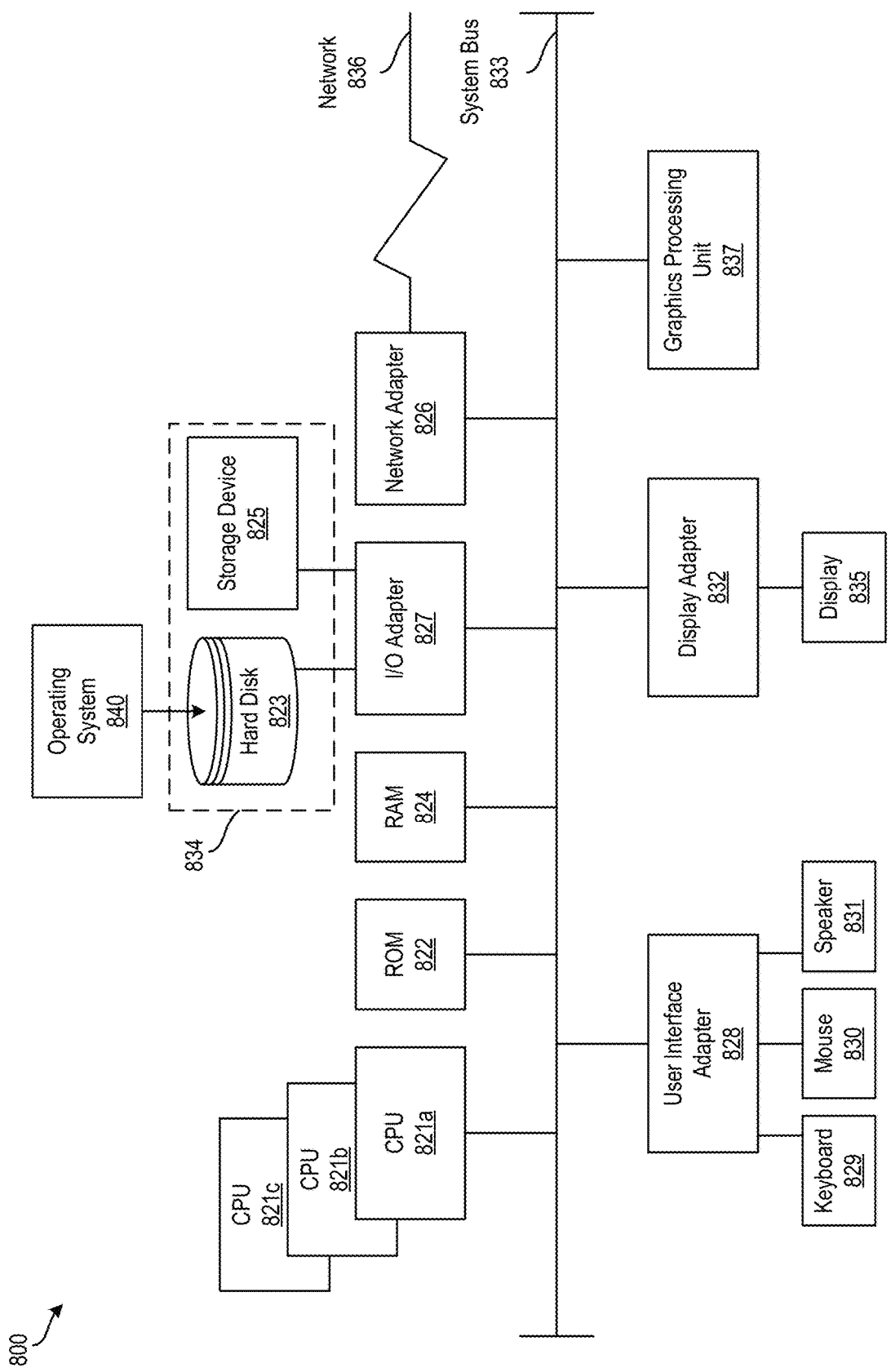
FIG. 8 depicts a block diagram of a processing system for implementing the presently described techniques according to one or more embodiments described herein.

It is understood that one or more embodiments described herein is capable of being implemented in conjunction with any other type of computing environment now known or later developed. For example, FIG. 8 depicts a block diagram of a processing system 800 for implementing the techniques described herein. In accordance with one or more embodiments described herein, the processing system 800 is an example of a cloud computing node 10 of FIG. 6. In examples, processing system 800 has one or more central processing units ("processors" or "processing resources" or "processing devices") 821a, 821b, 821c, etc. (collectively or generically referred to as processor(s) 821 and/or as processing device(s)). In aspects of the present disclosure, each processor 821 can include a reduced instruction set computer (RISC) microprocessor. Processors 821 are coupled to system memory (e.g., random access memory (RAM) 824) and various other components via a system bus 833. Read only memory (ROM) 822 is coupled to system bus 833 and may include a basic input/output system (BIOS), which controls certain basic functions of processing system 800.

Further depicted are an input/output (I/O) adapter 827 and a network adapter 826 coupled to system bus 833. I/O adapter 827 may be a small computer system interface (SCSI) adapter that communicates with a hard disk 823 and/or a storage device 825 or any other similar component. I/O adapter 827, hard disk 823, and storage device 825 are collectively referred to herein as mass storage 834. Operating system 840 for execution on processing system 800 may be stored in mass storage 834. The network adapter 826 interconnects system bus 833 with an outside network 836 enabling processing system 800 to communicate with other such systems.

A display (e.g., a display monitor) 835 is connected to system bus 833 by display adapter 832, which may include a graphics adapter to improve the performance of graphics intensive applications and a video controller. In one aspect of the present disclosure, adapters 826, 827, and/or 832 may be connected to one or more I/O busses that are connected to system bus 833 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 833 via user interface adapter 828 and display adapter 832. A keyboard 829, mouse 830, and speaker 831 may be interconnected to system bus 833 via user interface adapter 828, which may include, for example, a Super I/O chip integrating multiple device adapters into a single integrated circuit.

In some aspects of the present disclosure, processing system 800 includes a graphics processing unit 837. Graphics processing unit 837 is a specialized electronic circuit designed to manipulate and alter memory to accelerate the creation of images in a frame buffer intended for output to a display. In general, graphics processing unit 837 is very efficient at manipulating computer graphics and image processing, and has a highly parallel structure that makes it more effective than general-purpose CPUs for algorithms where processing of large blocks of data is done in parallel.

Thus, as configured herein, processing system 800 includes processing capability in the form of processors 821, storage capability including system memory (e.g., RAM 824), and mass storage 834, input means such as keyboard 829 and mouse 830, and output capability including speaker 831 and display 835. In some aspects of the present disclosure, a portion of system memory (e.g., RAM 824) and mass storage 834 collectively store the operating system 840 such as the AIX® operating system from IBM Corporation to coordinate the functions of the various components shown in processing system 800.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for identifying regression test failures, the method comprising:
comparing a base code to a new code to locate an updated aspect of a program to identify changes in the new code from the base code and a location of the changes;
generating a table that includes a unique identifier for each of the identified changes in the new code from the base code, a function associated with each of the identified changes, and a list of variables affected by each of the identified changes;
inserting, at the location of the changes, debug code into corresponding source files for each of the base code and the new code for the updated aspect, wherein the debug code includes a key tracing code for functions and variables affected by the updated aspect of the program and wherein the debug code is configured to output container-related information upon execution;
building a first image for the base code and a second image for the new code, the first and second images running in respective first and second containers;
comparing debugging outputs from a regression test of the respective first and second containers to identify a regression test failure, wherein identifying the regression test failure includes identifying that the regression test failed because a global variable was too large; and
implementing a corrective action to correct the regression test failure.

2. The computer-implemented method of claim 1, wherein the updated aspect comprises at least one of an updated function, an updated variable, or updated runtime information.

3. The computer-implemented method of claim 1, further comprising defining a configuration file to request a compiler to generate the debugging outputs.

4. The computer-implemented method of claim 1, wherein comparing the base code to the new code to locate the updated aspect of the program comprises identifying one or both of affected local functions and affected local variables.

5. The computer-implemented method of claim 1, further comprising, subsequent to building the first image and the second image, performing the regression test against the first image and the second image to generate the debugging outputs.

6. The computer-implemented method of claim 1, wherein comparing the base code to the new code to locate the updated aspect of the program comprises identifying a change in a value assigned to a variable between the new code from the base code.

7. The computer-implemented method of claim 1, wherein comparing the base code to the new code to locate the updated aspect of the program comprises identifying a difference between operations performed to a variable between the new code from the base code.

8. A system comprising:
a memory comprising computer readable instructions; and
a processing device for executing the computer readable instructions, the computer readable instructions controlling the processing device to perform operations comprising:
comparing a base code to a new code to locate an updated aspect of a program to identify changes in the new code from the base code and a location of the changes;
generating a table that includes a unique identifier for each of the identified changes in the new code from the base code, a function associated with each of the identified changes, and a list of variables affected by each of the identified changes;
inserting, at the location of the changes, debug code into corresponding source files for each of the base code and the new code for the updated aspect, wherein the debug code includes a key tracing code for functions and variables affected by the updated aspect of the program;

building a first image for the base code and a second image for the new code, the first and second images running in respective first and second containers;

comparing debugging outputs from a regression test of the respective first and second containers to identify a regression test failure, wherein identifying the regression test failure includes identifying that the regression test failed because a global variable was too large; and implementing a corrective action to correct the regression test failure.

9. The system of claim 8, wherein the updated aspect comprises at least one of an updated function, an updated variable, or updated runtime information.

10. The system of claim 8, the operations further comprising defining a configuration file to request a compiler to generate the debugging outputs.

11. The system of claim 8, wherein comparing the base code to the new code to locate the updated aspect of the program comprises identifying one or both of affected local functions and affected local variables.

12. The system of claim 8, further comprising, subsequent to building the first image and the second image, performing the regression test against the first image and the second image to generate the debugging outputs.

13. A computer program product comprising a computer readable storage medium having program instructions embodied therewith, the program instructions executable by a processor to cause the processor to perform operations comprising:

comparing a base code to a new code to locate an updated aspect of a program to identify changes in the new code from the base code and a location of the changes;

generating a table that includes a unique identifier for each of the identified changes in the new code from the base code, a function associated with each of the identified changes, and a list of variables affected by each of the identified changes;

inserting, at the location of the changes, debug code into corresponding source files for each of the base code and the new code for the updated aspect, wherein the debug code includes a key tracing code for functions and variables affected by the updated aspect of the program;

building a first image for the base code and a second image for the new code, the first and second images running in respective first and second containers;

comparing debugging outputs from a regression test of the respective first and second containers to identify a regression test failure, wherein identifying the regression test failure includes identifying that the regression test failed because a global variable was too large; and implementing a corrective action to correct the regression test failure.

14. The computer program product of claim 13, wherein the updated aspect comprises at least one of an updated function, an updated variable, or updated runtime information.

15. The computer program product of claim 13, the operations further comprising defining a configuration file to request a compiler to generate the debugging outputs.

16. The computer program product of claim 13, wherein comparing the base code to the new code to locate the updated aspect of the program comprises identifying one or both of affected local functions and affected local variables.

* * * * *